Nov. 22, 1938.  C. T. WALTER  2,137,903
SEWING CASINGS
Filed Nov. 21, 1936

Charles T. Walter
INVENTOR

BY
ATTORNEY

ATTEST -

Patented Nov. 22, 1938

2,137,903

UNITED STATES PATENT OFFICE 2,137,903

SEWING CASINGS

Charles T. Walter, Chicago, Ill., assignor to Industrial Patents Corporation, Chicago, Ill., a corporation of Delaware Application November 21, 1936, Serial No. 112,179

2 Claims. (Cl. 99—175)

This invention relates to a method of preparing casings for sewing.

One of the objects of the invention is to prepare animal intestines to provide suitable raw material for sewing casings.

Other objects of the invention will be apparent from the description and claims which follow.

In the preparation of casing material for encasing sausage specialties of relatively large diameter, it is customary to employ sewed casing membranes derived from such intestinal substances as beef middles.

It is desirable in the manufacture of larger types of sausage to employ casings of uniform size. Since beef middles vary considerably in size and are too small in diameter to be suitable for large diameter sausage specialties, it is necessary to prepare the beef middles in order to employ the animal membrane in building up large diameter casings.

In the manufacture of sewed casings from beef middles, the beef middles are cut into relatively short lengths and partially dried on solid spreaders, the drying being permitted to continue sufficiently to provide a firmly dried product which may be removed from the solid spreaders without tearing and which is sufficiently dried to permit handling in sewing.

Unless some means is employed to prevent adherence of the inner surface of the casing during drying, the casing material cannot readily be formed into sheets suitable for sewing.

The present invention contemplates handling such casings as beef middles in such a manner as to avoid the necessity of drying small pieces.

The invention will be more readily understood by reference to the drawing in which similar reference characters in the several figures indicate similar elements.

Figure 1 illustrates a beef middle with the fat side out.

In carrying out the present invention, assuming that beef middles are to be used as a source of raw material, the casings are cleaned and fatted in the conventional manner and are then cut into convenient lengths, for example, 12 feet in length. Pairs of casings of like diameter are selected. Each casing has two sides, one of which is conventionally referred to as the fat side, and the other, the slime side, it being conventional to employ the slime side as the outside of a stuffed sausage. Clean beef casings have been inverted and have the slime side out in usual practice, although the contrary is true with hog and sheep 10 casings.

Figure 1:
Figure 2:
Figure 2 illustrates a beef middle which has been inverted to place the slime side out.
Figure 3:
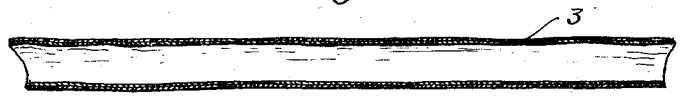
Figure 3 is a cross-sectional view of a double casing which has been prepared in accordance with the present invention.
Figure 4:
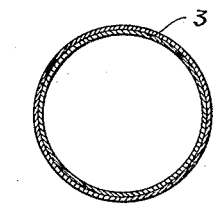
Figure 4 is another cross-sectional view of the casing shown in Figure 3.

In carrying out the present invention, one of each pair of beef middles is permitted to remain with the fat side out. The other is turned inside out so that the fat side is toward the inside of the casing. The latter casing is inserted into the casing with the fat side out so that the slime sides of both casings may be placed in contact, casing 1 shown in Figure 1 becoming the outside lamination and casing 2 shown in Figure 2 becoming the inside lamination of the double casing 3 shown in Figure 3 and in Figure 4.

Figure 6:
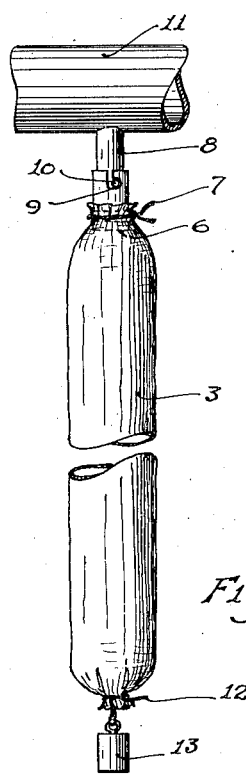
Figure 6 is a perspective view showing the manner of drying the double casing.
Figure 5:
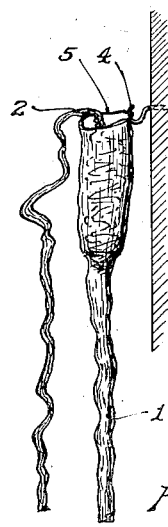
Figure 5 is a perspective view showing the manner of inserting one casing into another.

The insertion of casing 2 into casing 1 is accomplished by hanging one end of casing 1 on hook 4 shown in Figure 5. A short length of the one end of casing 2 is fed into the open end 5 of casing 1 and then a small quantity of water is introduced through opening 5. The water flowing through casing 1 carries with it the inserted end of casing 2 as the water flows into and through the outer casing. Once started, this flowing process continues automatically and the two upper ends of the two casings soon become adjacent. These two ends may be tied together around the end of a suitable air pressure drying nipple 6, as shown in Figure 6, by means of string 7. Nipple 6 is secured to nozzle 8 as by slot 9 and lug 10. Air passes through nozzle 8, being supplied through pipe 11 and inflates the double casing 3, which is preferably tied as with string 12 at the lower end and which may be held in taut position by suspended weight 13 which may be a one pound or two pound weight. Before string 12 is applied to the lower end of double casing 3, an operator strips the pair of casings by hand to insure that the inner casing contains no knots and that its fibers are substantially parallel to those of the outer casing. After this stripping process, the open ends of the two casings are tide together. This process results in a double casing, one within the other with the slime sides adjacent and in contact. An air pressure of from 12 to 24 inches of water is maintained within the casing, firmly inflating the inner against the outer casing. Under these conditions the casings are allowed to dry to the desired degree under orinary room temperature conditions, the internal air pressure remaining substantially constant during the entire drying period. If the casings are not dried to an extreme condition, they remain soft and flexible. In the event that the drying process is permitted to proceed too far, thus rendering the casings brittle, they may be reconditioned to the desired extent by the introduction of water vapor into the air of the drying room.

After the casings are dried to the desired degree, the weight and nipple are removed, which may be simply done by cutting a small portion of the casing at each end. The dried double casing may then be split longitudinally, providing two sheets of animal membrane firmly adhering to each other. This laminated sheet material may be cut into individual casing lengths of the desired size previous to sewing, or it may be put through a sewing machine and thereafter cut into suitable lengths. To accomplish the sewing operation it is merely necessary to pass the material through a sewing machine which will produce a stitch adjacent to one edge. The sheet is then put through the same or another sewing machine to produce another seam any desirable distance from the first sewing. Before the sewing operation, it is desirable to wet at least the edges of a casing through which the needle and thread penetrate. This moistening is necessary to prevent tearing of the casing by the sewing machine.

After the sewing operation has been completed, the casings may be soaked in water so as to soften them and loosen the adhesion between the sheets, after which they may be turned inside out. This turning reverses the seam so that the finished portion of the seam is to the outside of the sausage, and it also brings the slime side to the outside, which is preferable practice in the manufacture of sausage.

If desired, the casings, after being cut into suitable short lengths, may be sewed around one end. This sewing avoids the necessity of tying one end of the casing, it being merely necessary to tie the other end after the casing is stuffed out with sausage meat.

The present invention reduces handling costs in casing sewing practice by reason of the fact that the casings are handled in accordance with the present invention in multiple lengths rather than in short individual lengths as is the present practice.

No solid spreader is required in the drying operation as is necessary in conventional practice. Such spreaders tend to slow up drying by retaining moisture, are often unsanitary, and require frequent cleaning.

Casings dried in accordance with the present invention dry quickly and without the need of heated air, resulting in cleaner and sweeter casings.

It will be apparent from the foregoing that the present invention provides a simple, economical method for preparing natural casings for sewing whereby sewed casings of desired predetermined larger diameter may be readily produced.

I claim:

1. The method of inserting one casing within another which comprises hydraulically carrying one casing within the other.

2. The method of inserting one casing within another which comprises supporting one casing with one end open, inserting one end of the other casing into the open end for a short distance and then introducing water into the outer casing whereby the inserted end of the free casing is carried to the free end of the supported casing, forming a double casing.

CHARLES T. WALTER.